United States Patent
Doucerain

[15] 3,650,710
[45] Mar. 21, 1972

[54] ELEMENT WITH A LAMINATED METAL STRUCTURE

[72] Inventor: Jacques J. D. Doucerain, Massy, France

[73] Assignee: Societe de Traitements Electrolytiques et Electrothermiques (S.T.E.L.)

[22] Filed: Sept. 24, 1969

[21] Appl. No.: 860,727

[30] Foreign Application Priority Data

Sept. 25, 1968 France.....................................167577
Nov. 5, 1968 France.....................................172607

[52] U.S. Cl..............................29/196.2, 29/198, 219/9.5
[51] Int. Cl. ...............................B32b 15/18, B32b 15/20
[58] Field of Search ........................29/196.2, 197, 198, 194

[56] References Cited

UNITED STATES PATENTS

| | | | |
|---|---|---|---|
| 2,687,565 | 8/1954 | Schaefer et al. ..................29/196.2 X |
| 2,798,843 | 7/1957 | Slomin et al. .........................29/198 X |
| 2,916,337 | 12/1959 | Fike..................................29/196.2 X |
| 3,064,112 | 11/1962 | Hanzel................................29/197 X |
| 3,090,118 | 5/1963 | Hanzel................................29/197 X |
| 3,393,446 | 7/1968 | Hughes et al. ........................29/197 X |
| 3,436,805 | 4/1969 | Friske et al. .......................29/196.2 X |
| 3,473,216 | 10/1969 | Webb...................................29/198 X |

Primary Examiner—L. Dewayne Rutledge
Assistant Examiner—E. L. Weise
Attorney—Cushman, Darby & Cushman

[57] ABSTRACT

The problem of manufacturing heat-resistance elements with a laminated structure, comprising a plate of a metal having a comparatively low melting point, aluminum for example, is solved through coating this plate with a film of another metal having both a higher melting point and a high mechanical resistance allowing the holding in position of the aluminum plate when the latter is in the molten state. The aluminum plate can thus be brazed to another plate by means of a high temperature, and therefore reliable brazing, using a soldering metal or alloy whose melting point is higher than that of the aluminum.

11 Claims, 3 Drawing Figures

Patented March 21, 1972

3,650,710

ELEMENT WITH A LAMINATED METAL STRUCTURE

The present invention relates to elements with a laminated metal structure which, in use, come into contact with heat sources and in particular to heater elements which constitute the bases of cooking vessels.

It is well known to produce easily maintained heater elements which have high mechanical strength and provide substantially uniform distribution of the heat over their surface, by making them of a plate having good thermal conductivity, covered on at least one face by a plate of stainless steel, the latter for example being part of a larger plate worked, for example by press-forming, in order to constitute a cooking vessel.

The metal having the good thermal conductivity is frequently copper. Other metals or metal alloys, in particular aluminum, however, are more suitable because of their lower price and their better thermal conductivity for the same weight of metal used.

However the methods currently known for soldering an aluminum plate to a plate of stainless steel, present difficult problems:

Processes which employ melting are costly and require very delicate handling to achieve perfect bonding, and processes which employ brazing have to use soldering agents (metals or alloys) having a relatively low melting point, and at any rate lower than that of aluminum, in order to prevent melting. Brazing solders of this kind are liable to corrosion and can be destroyed by heat because of their low melting point.

The object of the present invention is to overcome these drawbacks.

According to the invention, there is provided an element with a laminated metal structure comprising a first and a second plate, the bodies of said first and second plates being respectively made of a first metal and of a second metal having a higher melting point than said first metal, said two pltes being brazed together through a layer of a soldering metal, the melting point of which is substantially lower than that of said second metal but too high for a brazing operation directly involving said first metal; the body of said first plate being coated, at least over that portion thereof which is in front of said layer, with a film of a third metal, said third metal having a high mechanical strength and a melting point substantially higher than that of said soldering metal.

The present invention has also for its object a method for manufacturing a two-plate element according to the invention.

The invention will be best understood and other characteristics thereof will appear by means of the following description and appended drawings in which.

For convenience's sake, throughout the description and claims the word "metal" should be understood as meaning either a homogeneous metal, or a metal alloy, whether the plates of the strafified element, the coating, or the soldering agent are concerned.

Figure 1:
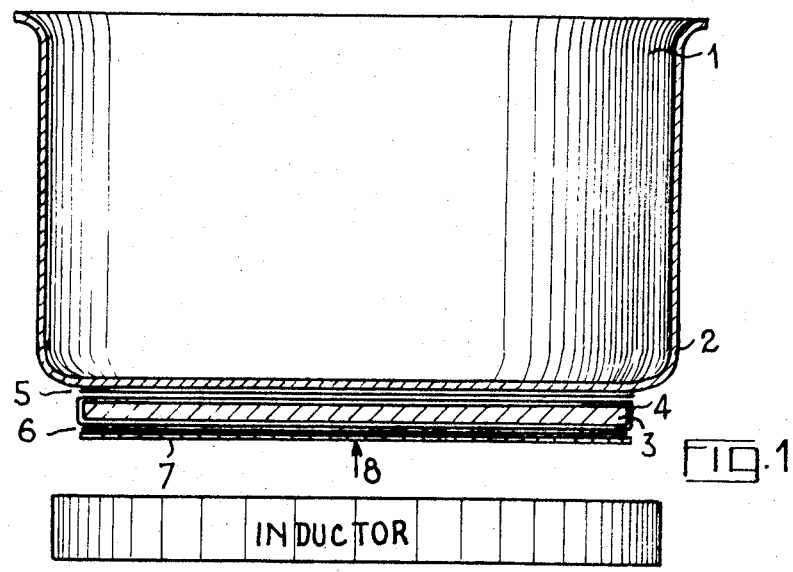
FIG. 1 is a section through a cooking vessel comprising a laminated metal element in accordance with the invention.

In FIG. 1, the base 2 of the vessel 1 of stainless steel, is covered by a plate 3 having an aluminum body entirely clad in a film of high strength metal 4 and bonded to the base 2 by brazing using the soldering metal 5. The plate 3 in turn is covered by a plate of stainless steel 7, by brazing using a soldering metal 6 identical to the soldering metal 5. The arrow 8 indicates the direction in which pressure has to be applied in order to obtain proper brazing, the latter being effected using the inductor 9 which may be of any conventional kind and is supplied from a high frequency generator (not shown).

The heater element in accordance with the invention is essentially formed by the stainless steel plate 2, integral with, and forming the base of, a vessel 1, and by the aluminum plate 3 whose encapsulating film 4 must satisfy the following specific requirements:

a melting temperature higher than that of the coated metal;
high mechanical strength;
adhesion to, and total compatibility with, the coated metal;
corrosion-resistance;
zero toxicity (at least as concern cooking vessels);
capability of being brazed to stainless steel.

Phosphor-nickel is an example of a metal which will satisfy these requirements if the coated metal is aluminum and is to be brazed to stainless steel, as in the case of the present example in which a coating of some 30 microns thickness can be used with a conventional soldering alloy whose melting point is around 680° C.

A pressure of 3 to 5 kg. per cm.² has to be exerted during the heating due to inductor 9.

During brazing, the phosphor-nickel film exercises the following two functions:

it substitutes itself for the aluminum, in the brazing process;
it ensures the holding in position of the aluminum which melts during the brazing operation; the aluminum is held in a sort of skin of high strength metal and does not suffer any appreciable distortion.

In fact, such a film is necessary even where the melting point of the soldering agent, for example an alloy melting at 620° C., is only slightly lower than that of the aluminum, since the plates are to be brought to a temperature higher than the melting point of the soldering agent if a reliable brazing is to be obtained.

After brazing, it is of course possible to dispense with that part of the coating which is situated beyond the joint. However that face of the coating which is opposite to the plate 2, may also be used, as in the example shown, to cover the plate 3 externally with a stainless steel plate 7 brazed on simultaneously under the same conditions as the plate 2.

The previously described arrangements have been found to be particularly advantageous since the heat required to produce the melting temperature in the brazed joint is produced by a heat source, the arrangement of which is such that the heat is transmitted to the base 2 through the whole of the thickness of the aluminum plate which melts in its entirety.

In the case where the heater element does not comprise a second stainless steel plate on the other face of the aluminum plate, such a process may appear to be something of a paradox; however, it is justified on the one hand by practical and industrial considerations, in particular by the excellent temperature distribution which it secures in the brazed joint, and on the other hand by the simplification of the manufacturing arrangement.

However, the melting of the totality of the aluminum plate makes it necessary to give the metal coating which keeps the molten aluminum in position, a substantial thickness.

It is possible to overcome this drawback by another manufacturing method.

Figure 2:
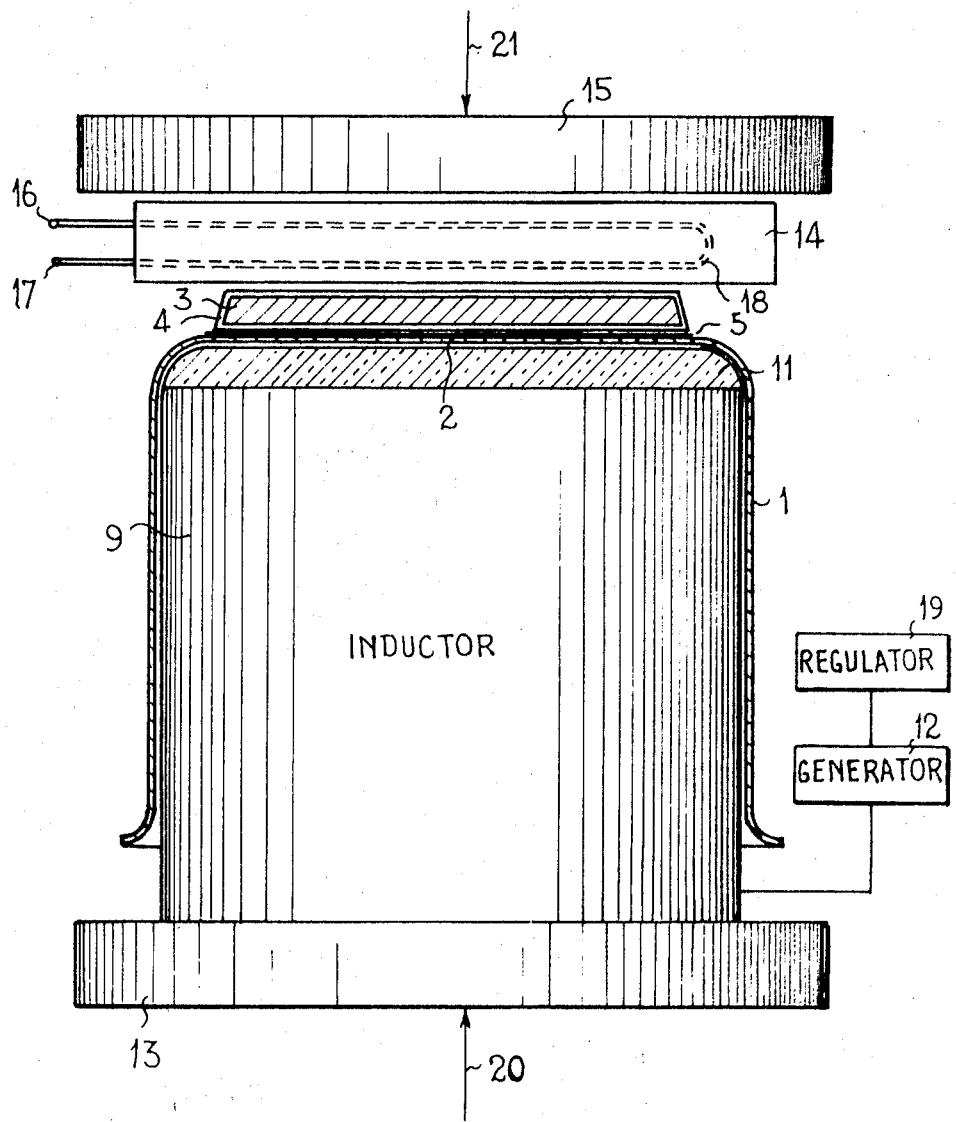
FIG. 2 is a section through an arrangement for carrying out the method according to the invention.

In FIG. 2, where references identical to those used in FIG. 1 relate to the same parts, the base 2 of the vessel 1 of stainless steel, is covered by an aluminum plate 3 which is clad in a coating of phosphor-nickel 4, the base and the plate being separated by a layer of soldering metal 5.

The face of the base 2 which is opposite to the aluminum plate 3, is covered by a plate of refractory dielectric material 11, itself covered in turn by an inductor 9 supplied from a high frequency generator 12 and its regulator 19. That face of the plate 3 which is opposite to the base 2 is covered by a metal slab 14 with internal ducts 18 having external entrance 16 and exit 17 allowing the circulation of water in ducts 18. The stacked arrangement thus produced is inserted between two press plates 13 and 15 which exercise a force in the direction of the corresponding arrows 20 and 21.

Brazing proper is carried out under the same conditions as those previously described, but the heat source, thanks to the arrangement used, operates with maximum efficiency in that part of the plate 3 located close to the brazing solder, the plate of refractory material 11 helping to ensure uniform distribution of heat. On the other hand, that part of the plate 3 located opposite to the soldering metal, is submitted to the action of the cold body 14 and this produces, through the thickness of the plate 3, a substantial temperature gradient which is such as to maintain solid that part which is in contact with the cold body 14 whilst the part in contact with the hot source is in the molten condition.

As a consequence, the thickness of the coating may be reduced; it is also possible to coat the plate 3 only on those portions thereof which are liable to melt; in any case that portion of the surface of plate 3 which is in contact with the soldering agent must obviously be coated.

This condition of thermal equilibrium which may at first sight appear to be a precarious one, can in fact be very easily maintained during the time required for brazing, provided that the supply of energy by the hot source and the extraction of energy by the cold body 14, are properly regulated.

The supply by energy to the hot source is obtained by regulating the high frequency current in the inductor 9 by any suitable known means 19.

Regulation of the extraction of energy through the cold body is obtained by regulating the flow of water through the component 14, this water being injected at a fixed temperature.

The above structures and methods of course also apply where the plate with the higher melting point is of a substance other than stainless steel.

Figure 3:
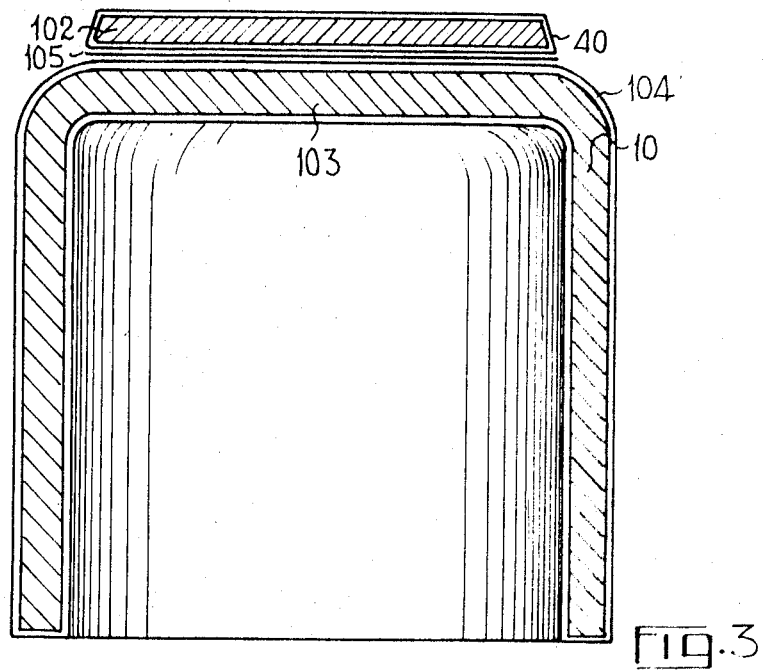
FIG. 3 is a section through a further laminated element according to the invention.

However, in some cases, some difficulties may arise, in particular as concerns adhesion, which difficulties can be solved through coating also the plate with the higher melting point with a film of the same nature as that which is used for the plate with the lower melting point. In FIG. 3, the aluminum cylindrical component 10, a base of which, 103, forms one of the plates of a laminated element, is entirely coated with a film 104 of phosphor-nickel. A circular titanium plate 102, also coated with a film 40 of phosphor-nickel, adheres to this flat circular base 103 through the soldering agent 105.

The brazing may be effected according to the above described methods, elements 102, 103, 104 and 105 of FIG. 3 respectively playing the part of elements 2, 3, 4 and 5 of FIGS. 1 and 2.

Since the purpose of the film 40, coating the plate 102, is essentially to facilitate the adhesion to the soldering agent, this film need not necessarily coat the whole of the surface of the plate 102. In particular, if this latter plate forms part of a complex mechanical component, the coating may be limited to the surface in contact with the soldering agent.

The invention can in particular advantageously be applied in the manufacturing of pistons for internal combustion engines, where those pistons are made of an aluminum alloy, and it is desired to protect their tops by means of a titan plate improving their resistance to the action of burning or corrosive gases.

What is claimed, is,

1. An element with a laminated metal structure comprising a first and a second plate, the bodies of said first and second plates being respectively made of a first metal and of a second metal having a higher melting point than said first metal, said two plates being brazed together through a layer of a soldering metal, the melting point of which is substantially lower than that of said second metal but too high for a brazing operation directly involving said first metal; the body of said first plate being coated, at least over that portion thereof which is in front of said layer, with a film of a third metal, said third metal having a high mechanical strength and a melting point substantially higher than that of said soldering metal.

2. An element as claimed in claim 1, wherein the melting point of said first metal is lower than that of said soldering metal.

3. An element as claimed in claim 1, wherein the melting point of said first metal is substantially equal to that of said soldering metal.

4. An element as claimed in claim 1, wherein said film coats the whole of the surface of said body of said first plate.

5. An element as claimed in claim 1, comprising only said two plates, said first metal being aluminum and said second metal being stainless steel.

6. An element as claimed in claim 1, wherein said first metal is aluminum and said second metal stainless steel, and said element comprises a further plate of said second metal; said first plate being inserted between said second plate and said further plate and being brazed to said further plate through a further layer of said soldering metal, and the body of said first plate being coated with a further film of said third metal.

7. An element as claimed in claim 1, wherein said third metal is phosphor-nickel.

8. An element as claimed in claim 1, wherein said film is a film which has been deposited by a chemical process.

9. An element as claimed in claim 1, wherein, said element comprising only two plates, the body of said second plate is also coated, at least over that portion of the surface thereof, which is in front of said layer, with a film of said third metal.

10. An element as claimed in claim 9, wherein said second metal is titanium.

11. An element as claimed in claim 1, wherein at least one of said two plates is an integral part of a component made of the same metal as this plate.

* * * * *